United States Patent
Fryer

(10) Patent No.: US 8,111,214 B2
(45) Date of Patent: Feb. 7, 2012

(54) CHARGE RECOVERY FOR ENHANCED TRANSISTOR DRIVE

(75) Inventor: Christopher James Newton Fryer, Cambridge (GB)

(73) Assignee: Mflex UK Limited, Cambridge (GB)

( * ) Notice: Subject to any disclaimer, the term of this patent is extended or adjusted under 35 U.S.C. 154(b) by 708 days.

(21) Appl. No.: 10/569,290

(22) PCT Filed: Aug. 23, 2004

(86) PCT No.: PCT/GB2004/003610
§ 371 (c)(1),
(2), (4) Date: Feb. 15, 2007

(87) PCT Pub. No.: WO2005/020200
PCT Pub. Date: Mar. 3, 2005

(65) Prior Publication Data
US 2007/0139301 A1 Jun. 21, 2007

(30) Foreign Application Priority Data
Aug. 22, 2003 (GB) .................................. 0319839.7

(51) Int. Cl.
*G09G 3/30* (2006.01)
(52) U.S. Cl. ........................................ 345/76; 315/169.3
(58) Field of Classification Search .................. 345/102, 345/211–213, 76; 315/169.3
See application file for complete search history.

(56) References Cited

U.S. PATENT DOCUMENTS

| 5,191,321 | A |   | 3/1993 | Herold et al. |   |
|---|---|---|---|---|---|
| 5,736,973 | A | * | 4/1998 | Godfrey et al. | 345/102 |
| 5,821,701 | A | * | 10/1998 | Teggatz et al. | 315/307 |
| 5,982,105 | A |   | 11/1999 | Masters |   |
| 6,175,192 | B1 |   | 1/2001 | Moon |   |
| 6,369,517 | B2 | * | 4/2002 | Song et al. | 315/194 |
| 6,693,387 | B2 | * | 2/2004 | Wood | 315/169.3 |
| 2001/0054918 | A1 |   | 12/2001 | Nakamura |   |

FOREIGN PATENT DOCUMENTS

| EP | 0699015 B1 | 2/1996 |
| EP | 0971565 B1 | 1/2000 |
| GB | 2333911 A | 8/1999 |
| GB | 2372647 A | 8/2002 |
| WO | WO 99/55121 A1 | 10/1999 |
| WO | WO 00/72638 A1 | 11/2000 |
| WO | WO 02/069674 A1 | 9/2002 |

OTHER PUBLICATIONS

International Search Report, PCT/GB2004/003610, Dec. 3, 2004, 3 pages.
Written Opinion, PCT/GB2004/003610, 5 pages.
Notification of International Search Report and Written Opinion, PCT/GB2004/003610, Dec. 3, 2004, 12 pages.
Office Action for European application No. EP 04 768 166.3, mailed May 14, 2009.

* cited by examiner

*Primary Examiner* — Amr Awad
*Assistant Examiner* — Stephen Bray
(74) *Attorney, Agent, or Firm* — Keating & Bennett, LLP

(57) ABSTRACT

A control circuit for an electro luminescent display in which a flyback converter and an H-bridge are used to provide a high voltage alternating current to a capacitive load from a low voltage DC source. Each time the polarity of the capacitive load is reversed, the capacitive load discharges. This high voltage discharge is stored on a low voltage capacitor and subsequently used as an auxiliary power supply to power the switching elements of the control circuit.

13 Claims, 3 Drawing Sheets

CHARGE RECOVERY FOR ENHANCED TRANSISTOR DRIVE

The present invention relates to electroluminescent displays and their controllers and, in particular, to the power supplied to the control circuitry.

Electroluminescent displays have selectively illuminable regions for displaying information. Such displays have the advantage over competing technologies that they can be large, flexible and are relatively inexpensive.

Although electroluminescent lamps were known in the 1950's, these had a short lifetime and it was not until the 1980's that a flexible electroluminescent device was developed. However, this was used as an LCD backlight and only recently have practical electroluminescent displays become available.

Electroluminescent displays generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The display may be formed by depositing electrode layers and phosphor layers onto the substrate, for example by screen printing, in which case opaque electrodes may be formed from conductive, for example silver-loaded, inks. Examples of electroluminescent devices are described in WO 00/72638 and WO 99/55121.

An electroluminescent display of the general type described above is illuminated by applying an alternating voltage of an appropriate frequency between the electrodes of the lamp to excite the phosphor. Commonly, the phosphors used in electroluminescent displays require a voltage of a few hundred volts. Typically, such electroluminescent displays may have a capacitance in the range 100 pF to 1 µF.

Since only a small current is required, this comparatively high drive voltage can easily be produced from a low voltage DC supply by a circuit such as the well known "flyback converter".

This comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch. When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed. The capacitor can therefore be charged to a voltage that is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches, there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

The switching elements used in the converter circuit and in the H-bridge are generally field effect transistors (FETs). The resistance of a FET is dependant on the voltage applied to its gate terminal. The higher the voltage applied to the gate, the lower the resistance of the FET. A low resistance is desirable in the control circuits of electroluminescent displays as a higher efficiency of the driver can then be achieved. i.e. a lower current draw for equivalent brightness. This is of particular relevance to battery operated devices in which it is desirable to increase the battery's service life.

The MOSFETs typically used in an electroluminescent display circuit require a gate voltage in excess of 4V and preferably have a gate voltage in the region of 9V. Therefore, a typical power supply consisting of 2 AA batteries cannot provide sufficient power to drive the FETs. More batteries could be provided, but this is undesirable in many applications where it is desirable to make a product as small as possible. One known method to increase the voltage supplied to the FETs is to use a voltage doubler circuit. However, towards the end of the batteries' service life, even a voltage doubler can only achieve about 3.5 V from 2 AA batteries. Several doubler circuits can be arranged in series, but this becomes less efficient and more expensive.

According to the invention there is provided a control circuit for supplying a capacitive load with a high voltage alternating current or pulsed direct current from a low voltage DC source, wherein the high voltage current which is discharged from the capacitive load during operation is used as an auxiliary power supply for driving the switching elements of said control circuit.

The invention is most usefully applied to electroluminescent displays. As described above, these are typically driven with an alternating current supplied via an H-bridge. When the H-bridge is in a first state, the capacitive load is charged in one direction. Then, the H-bridge is switched into a second state in order to charge the capacitive load in the opposite direction. Immediately after switching the H-bridge from the first state to the second state or vice versa, the capacitive load discharges. In most applications, this charge is lost. As the capacitive load is charged to a high voltage via the converter circuit, this charge loss represents a significant energy loss. However, the inventor of the present invention has realised that this source of high voltage charge can be used as an auxiliary power supply to provide a gate drive to the control circuit of the electroluminescent display which may be higher than in the prior art devices without the need for additional batteries.

The discharge from the capacitive load may be an uncontrolled discharge, but preferably it is achieved by means of a controlled discharge circuit connected in parallel with the H-bridge.

Whilst in certain circumstances it may be appropriate or desirable to store the full voltage of the capacitive load, in most cases this voltage will be too high for the associated control circuitry and would then have to be reduced in some way, e.g. by voltage divider circuits. However, it is preferable to limit the voltage that is produced. Therefore the control circuit may further comprise a voltage limiting device for limiting the voltage of the auxiliary power supply.

The auxiliary power supply is preferably arranged to provide at least 4V and more preferably 9V. However, as the invention will commonly be used for providing a power supply for controlling high voltage silicon FETs. Therefore, the voltage limiting device preferably limits the voltage of the auxiliary power supply to a nominal 12V.

Although any suitable kind of voltage limiting device may be used, in a preferred embodiment of the invention the voltage of the auxiliary power supply is limited by means of a zener diode connected in parallel with the auxiliary power supply. This helps to keep down the cost and component count of the circuit. The auxiliary power supply preferably also comprises a low voltage capacitor on which the charge from the capacitive load is stored.

As noted above, the invention is of particular application in the control of electroluminescent displays and so the switching elements of the control circuit are preferably MOSFETs and the auxiliary power supply is arranged to supply current to control these.

Where the control circuit comprises the usual arrangement of an H-bridge having two parallel limbs, each limb having a first switching element in series with a second switching element and a node between the first and second switching elements, the auxiliary power supply is preferably used to control each of the switching elements. Likewise, the control circuit also usually comprises a converter powered by the low voltage DC source and arranged to supply current to the H-bridge to charge the capacitive load to a voltage which is higher than that of the DC source. The auxiliary power supply is therefore preferably used (additionally or alternatively) to control each of the switching elements.

Viewed from another aspect, therefore, the invention provides a control circuit as described above, wherein the output from the auxiliary power unit is used to provide control signals for transistors in both a voltage converter section and an H-bridge section of the circuit. The control circuit preferably has the other preferred features set out above. The invention also extends to an electroluminescent display driven by such a control circuit.

According to a further aspect of the invention, there is provided a method supplying a capacitive load with a high voltage alternating current or pulsed direct current from a low voltage DC source by means of a control circuit, wherein the high voltage current which is discharged from the capacitive load during operation is used as an auxiliary power supply for driving switching elements of said control circuit.

In at least the preferred embodiments, the method further comprises the features and advantages described above in relation to the other aspects of the invention.

An embodiment of the invention will now be described, by way of example only, with reference to the accompanying drawings in which.

Figure 1A:
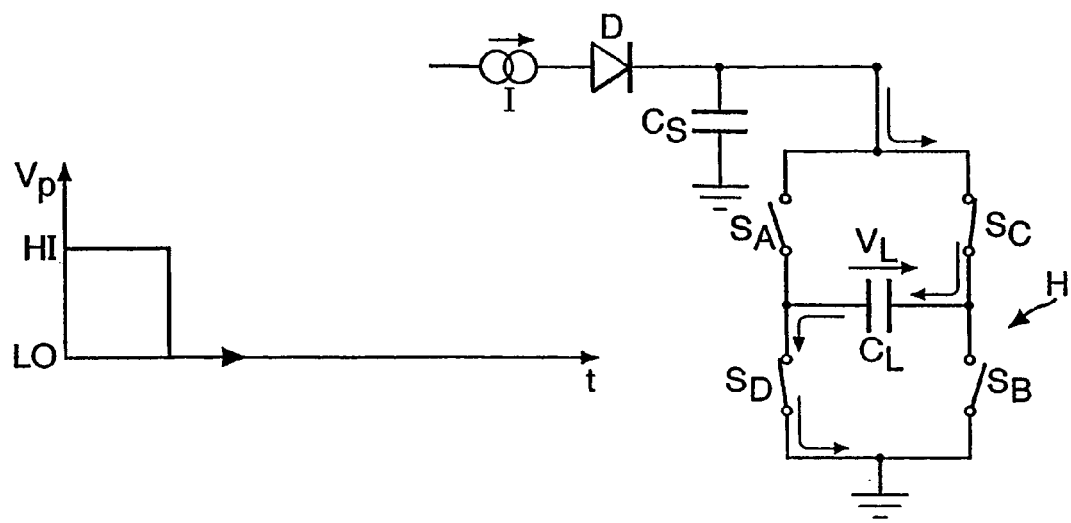
FIGS. 1a and 1b represent the operation of an H-bridge for use with the invention.

Referring to FIG. 1a, there is shown an electronic circuit in accordance with the invention. The circuit comprises a current source I in series with a diode D and an H-bridge arrangement H. A smoothing capacitor $C_S$ is provided in parallel with the H-bridge arrangement H and is connected to earth potential.

The H-bridge arrangement H in FIG. 1a comprises four switching elements $S_A$ to $S_D$ which are represented as simple switches for reasons of clarity. In a practical circuit, the switches $S_A$ to $S_D$ are provided by field effect transistors (FETs). The H-bridge comprises two parallel limbs each having two switches $S_A$, $S_D$ and $S_C$, $S_B$ arranged in series. A capacitive load $C_L$ in the form of an electroluminescent lamp is connected between the limbs of the H-bridge at nodes on each limb which are between the switches of the limb. The H-bridge is connected to earth potential at one end.

Figure 1B:
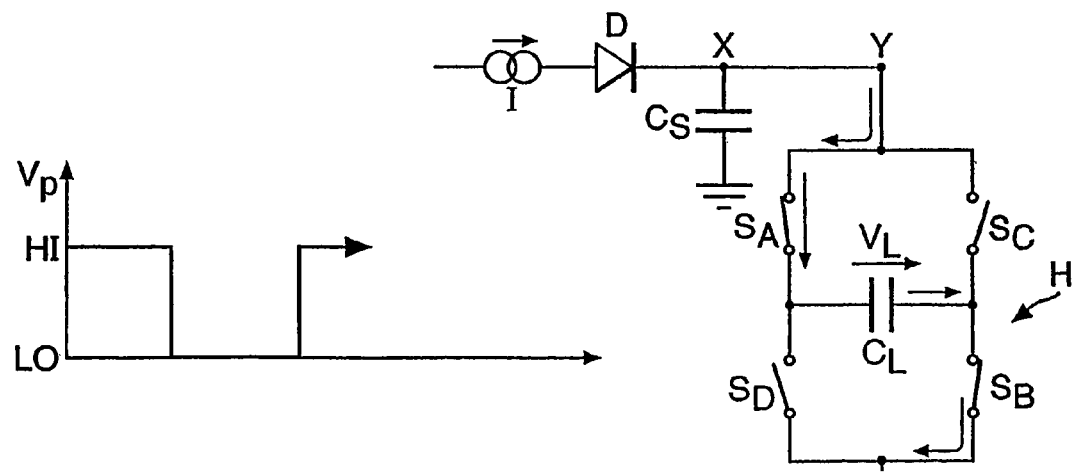

The positions of the switches $S_A$ to $S_D$ are controlled by a polarity voltage $V_P$, the variation of which over time is represented in FIGS. 1a and 1b. When $V_P$ is low, switches $S_A$ and $S_B$ are open and do not conduct and switches $S_C$ and $S_D$ are closed and conduct. This situation is shown in FIG. 1a. When $V_P$ is high, switches $S_A$ and $S_B$ are closed and conduct while switches $S_C$ and $S_D$ are open and do not conduct. This situation is illustrated in FIG. 1b.

The operation of the circuit shown in FIGS. 1a and 1b will now be described. A converter such as a flyback converter or forward converter, represented as a current source I, supplies current via the diode D to the smoothing capacitor $C_S$ and the capacitive load $C_L$. The direction in which the capacitive load $C_L$ is charged is determined by the position of the switches $S_A$ to $S_D$. The capacitors $C_S$ and $C_L$ continue to be charged until the current source I ceases to supply current. The voltage on the capacitors $C_S$ and $C_L$ consequently rises. Reverse current flow from the capacitors is prevented by the diode D.

Thus, when the capacitive load $C_L$ is fully charged to the load voltage $V_L$, the charge thereon is $C_L V_L$ and the charge on the smoothing capacitor is $C_S V_L$. When the polarity voltage $V_P$ goes high, as shown in FIG. 1b, the polarity of the charged capacitive load $C_L$ with respect to the smoothing capacitor $C_S$ and the current source is reversed. Thus, point Y in FIG. 1b is at a potential $-V_L$ relative to earth potential, while the potential at point X is $+V_L$ relative to earth potential. This potential difference causes current to flow until points X and Y are at the same potential.

If the capacitance of the smoothing capacitor $C_S$ is large, it supplies sufficient charge to the capacitive load $C_L$ to bring the voltage on the capacitive load $C_L$ UP to approximately the load voltage $V_L$. However, in doing so, the smoothing capacitor $C_S$ has provided $2C_L V_L^2$ of energy to the capacitive load which must be replaced from the current source I. Thus, for each cycle of the H-bridge, $4C_L V_L^2$ of energy is drawn from the current source I.

Figure 2A:
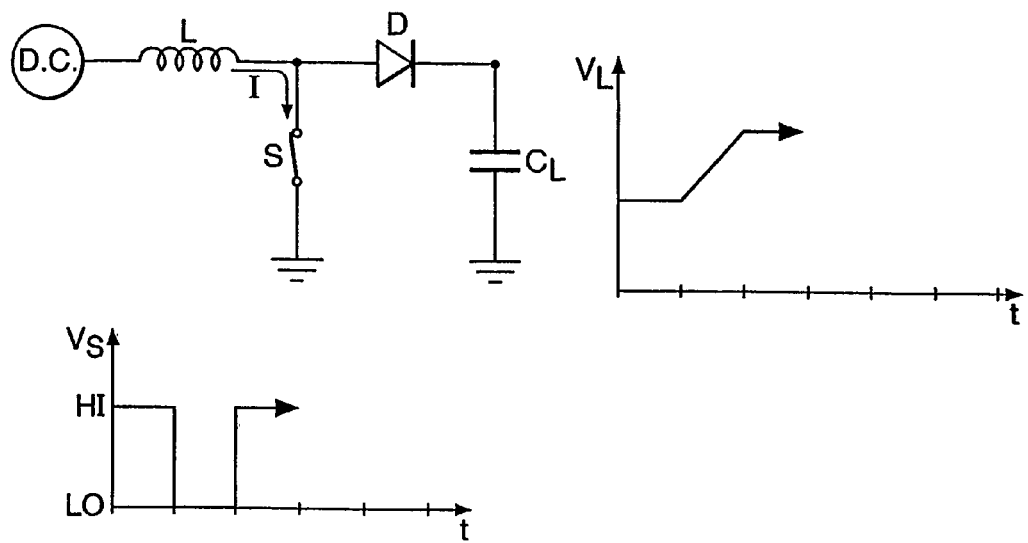
FIGS. 2a and 2b represent the operation of a flyback converter for use with the invention.
Figure 2B:
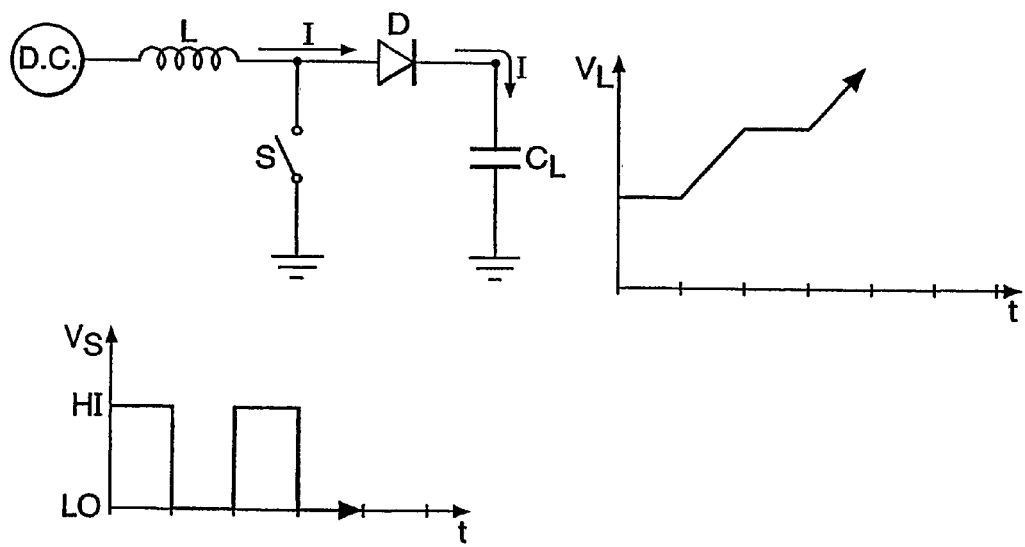

FIGS. 2a and 2b show an arrangement of a flyback converter for charging a capacitive load to a high voltage. The flyback converter shown in FIG. 2 can be used with the H-bridge arrangement H shown in FIG. 1, by replacing the components $C_L$ downstream of the diode D in FIG. 2 with the components $C_S$ $C_L$ $S_A$-$S_D$ downstream of the diode D in FIG. 1. For the sake of simplicity the capacitive load $C_L$ is shown in FIG. 2 without the H-bridge.

As shown in FIG. 2a, the flyback converter comprises a DC supply in series with an inductor L and a switch S. The switch S is connected between the inductor and earth potential. In a practical arrangement, the switch S is provided by a field effect transistor, the output FET. However, for the sake of clarity, in FIGS. 2a and 2b the switch S is shown as a simple switch.

In parallel with the switch S is provided a diode D in series with the capacitive load $C_L$. The capacitive load $C_L$ is arranged between the diode and earth potential.

The switch S is controlled by a switch voltage $V_S$ which varies over time as indicated in FIG. 2a. When the switch voltage $V_S$ is high, the switch S is closed and conducts. This situation is shown in FIG. 2a. When the switch voltage $V_S$ is low, the switch S is open and does not conduct. This situation is shown in FIG. 2b.

The circuit shown in FIGS. 2a and 2b operates as follows. While the switch voltage $V_S$ is high, as shown in FIG. 2a, current I flows from the DC supply through the inductor L and the closed switch S to earth. Assuming the voltage on the capacitive load $C_L$ is higher than the DC supply voltage, no current flows through the diode D.

When the switch voltage $V_S$ goes low, as shown in FIG. 2b, the current path through the inductor L and switch S is interrupted by the open switch S. However, the energy stored in the magnetic field associated with the inductor L forces the current I to continue flowing and the inductor L generates a sufficiently high voltage that the current I flows through the diode D to charge the capacitive load $C_L$. In this way, with each transition of the switch voltage $V_S$ from high to low, the voltage $V_L$ on the capacitive load $C_L$ is increased, as indicated in FIG. 2b. The diode D prevents current flow back from the capacitive load $C_L$ to earth or to the DC supply when the switch S is closed.

It will be seen therefore that the capacitive load $C_L$ can be charged to any desired voltage by applying an alternating switch voltage $V_S$ to the switch S.

Figure 3:
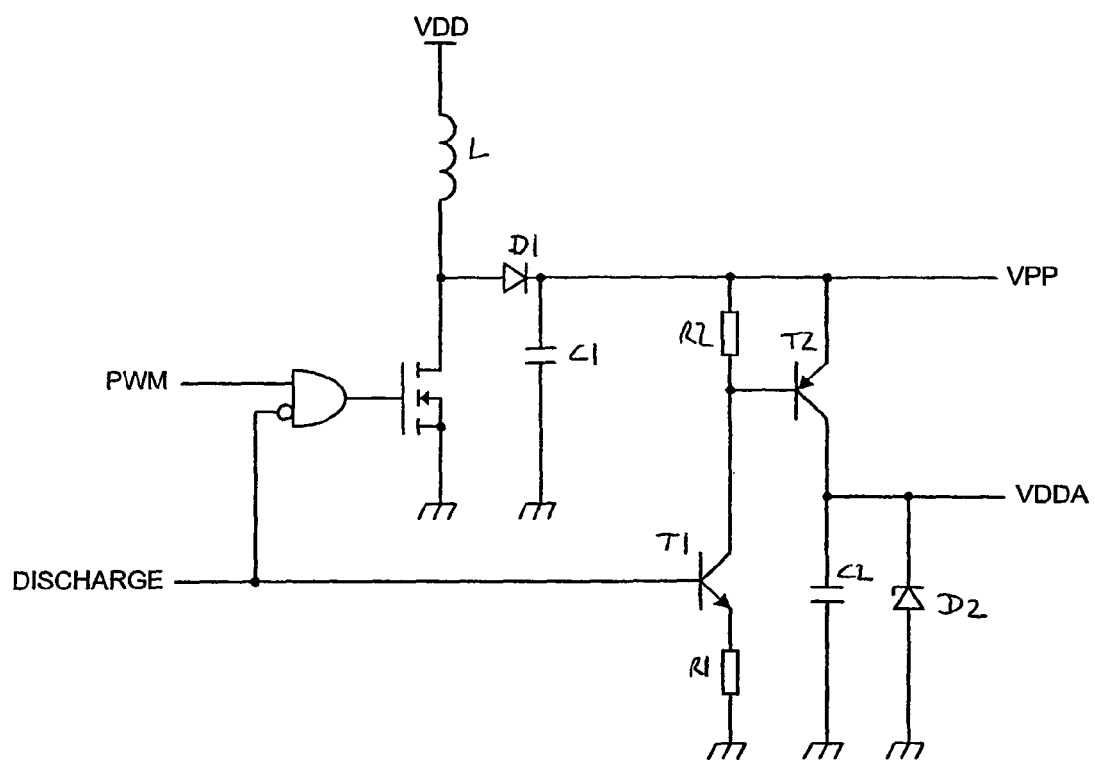
FIG. 3 illustrates a preferred embodiment of the invention.

FIG. 3 show a circuit in which the discharge from the capacitive load is used to provide operating power to the transistors of the control circuit.

The inductor L, FET and diode D1 form a flyback converter as described above in relation to FIGS. 2a and 2b. A smoothing capacitor C1 is also shown. The H-bridge of FIGS. 1a and 1b is omitted for the sake of simplicity. It would be connected to the circuit shown on the rail labelled VPP.

In FIG. 3, VDD represents the DC source, PWM represents a Pulse Width Modulated signal used for driving the flyback converter, DISCHARGE represents the control signal used to discharge current from the capacitive load prior to the direction of the H-bridge being switched and VDDA represents the output of the auxiliary power supply circuit which is used to drive the switching elements of the control circuit.

The flyback converter of the circuit of FIG. 3 is driven by the result of a logical AND operation on the PWM signal and the inverse of the DISCHARGE current. i.e. when the capacitive load is discharging, the DISCHARGE signal is high and the flyback converter is not operational. When the capacitive load has finished discharging, the DISCHARGE signal is low and the flyback converter is driven by the PWM signal. When the PWM signal is high, the FET of the flyback converter is in a conducting state and there is a current path from VDD through the inductor L and the FET to ground. When the PWM signal becomes low, the FET of the flyback converter becomes non-conducting and breaks the current path. However, as the magnetic field of the inductor L collapses, current is forced (at high voltage) to continue flowing through the inductor L and through the diode D1 to charge the reservoir capacitor C1 and the capacitive load (not shown). In this way, as the FET is pulsed on and off by the PWM signal, the reservoir capacitor C1 and the capacitive load can be charged to a much higher voltage than that of the DC source.

When the DISCHARGE signal is high, the npn transistor T1 turns on and permits current to flow through its collector. This in turn causes a current to flow into the base of the pnp transistor T2 thus causing T2 to turn on. When T2 is in the 'on' state, there is a current path from VPP to VDDA i.e. there is a current path from the capacitive load and the smoothing capacitor C1 to the auxiliary power supply capacitor C2. In this way, the auxiliary power supply capacitor C2 is charged using the discharge from the capacitive load. A zener diode D2 is provided in parallel with the auxiliary power supply capacitor C2 in order to limit the voltage across the auxiliary power supply capacitor C2. The zener diode will typically limit this voltage to around 12 V.

The output of the auxiliary power supply circuit (VDDA) is then used to power the FETs of the H-bridge rather than drawing power from the battery (VDD). The FETs of the H-bridge generally require a base voltage of at least 4V, and their resistance becomes less at higher voltage (preferably around 9V) making the H-bridge circuit more efficient. Thus the auxiliary power supply circuit provides a high voltage power supply for operating these FETs without drawing power from the DC source and without having to use voltage doubling circuits. Thus the circuit as a whole is more efficient and the battery life is prolonged.

The invention claimed is:

1. A control circuit comprising:
a low voltage DC source;
a supply circuit including:
a converter including at least one converter switching element and arranged to receive a first voltage supplied from the low voltage DC source and to generate a pulsed direct current; and
switching elements arranged to define an H-bridge circuit including two parallel limbs that each include a first switching element in series with a second switching element and a node between the first and second switching elements;
a capacitive load connected between the respective nodes of the two parallel limbs and arranged to be charged to a voltage which is higher than that of the low voltage DC source by receiving the pulsed direct current from the H-bridge circuit; and
a discharge circuit arranged to receive a high voltage discharge current from the capacitive load and to generate a second voltage that is higher than the first voltage at least during charging of the capacitive load; wherein
the second voltage is used to drive the switching elements of the H-bridge circuit and the at least one converter switching element.

2. A control circuit according to claim 1, wherein the discharge circuit is a controlled discharge circuit connected in parallel with the H-bridge circuit.

3. A control circuit according to claim 1, wherein the discharge circuit includes a voltage limiting device arranged to limit the second voltage.

4. A control circuit according to claim 3, wherein the voltage limiting device limits the second voltage to a nominal 12 V.

5. A control circuit according to claim 3, wherein the discharge circuit includes a low voltage capacitor.

6. A control circuit according to claim 5, wherein the voltage limiting device includes a zener diode connected in parallel with the low voltage capacitor.

7. A control circuit according to claim 1, wherein the switching elements of the control circuit are MOSFETs.

8. A control circuit according to claim 1, wherein the control circuit includes a smoothing capacitor connected in parallel with the capacitive load.

9. A control circuit according to claim 1, wherein the capacitive load is an electroluminescent display.

10. A control circuit according to claim 1, wherein the second voltage is at least 4 V.

11. A control circuit according to claim 1, wherein the second voltage is at least 9 V.

12. A method supplying a capacitive load:
generating a pulsed direct current from a first voltage provided by a low voltage DC source using at least one generating switching element;
supplying the pulsed direct current to the capacitive load through switching elements arranged to define an H-bridge circuit that includes two parallel limbs that each include a first switching element in series with a second switching element and a node between the first and second switching elements, the capacitive load is connected between the respective nodes of the two parallel limbs and is arranged to be charged to a voltage which is higher than that of the low voltage DC source by receiving the pulsed direct current from the H-bridge circuit;

generating a second voltage that is higher than the first voltage at least during charging of the capacitive load, from a high voltage current that is discharged from the capacitive load; and driving the switching elements of the H-bridge circuit and the at least one generating switching element with the second voltage.

13. A control circuit arranged to supply a pulsed direct current, the control circuit comprising:

a low voltage DC source providing a first voltage;

an H-bridge circuit including two parallel limbs that each include a first switching element in series with a second switching element and a node between the first and second switching elements;

a load connected between the respective nodes of the two parallel limbs and arranged to be charged to a voltage which is higher than that of the low voltage DC source by receiving the pulsed direct current; and a converter connected to the low voltage DC source, arranged to generate the pulsed direct current, and including at least one converter switching element; wherein the control circuit is arranged to drive the load and to receive current from the load such that the current received from the load is used to drive the switching elements of the H-bridge circuit and the at least one converter switching element; and the first and second switching elements and the at least one converter switching element are driven at a second voltage higher than the first voltage at least during charging of the capacitive load.

* * * * *